J. WOODWARD.
Seed Planter.
No. 9,125.
Patented July 13, 1852.
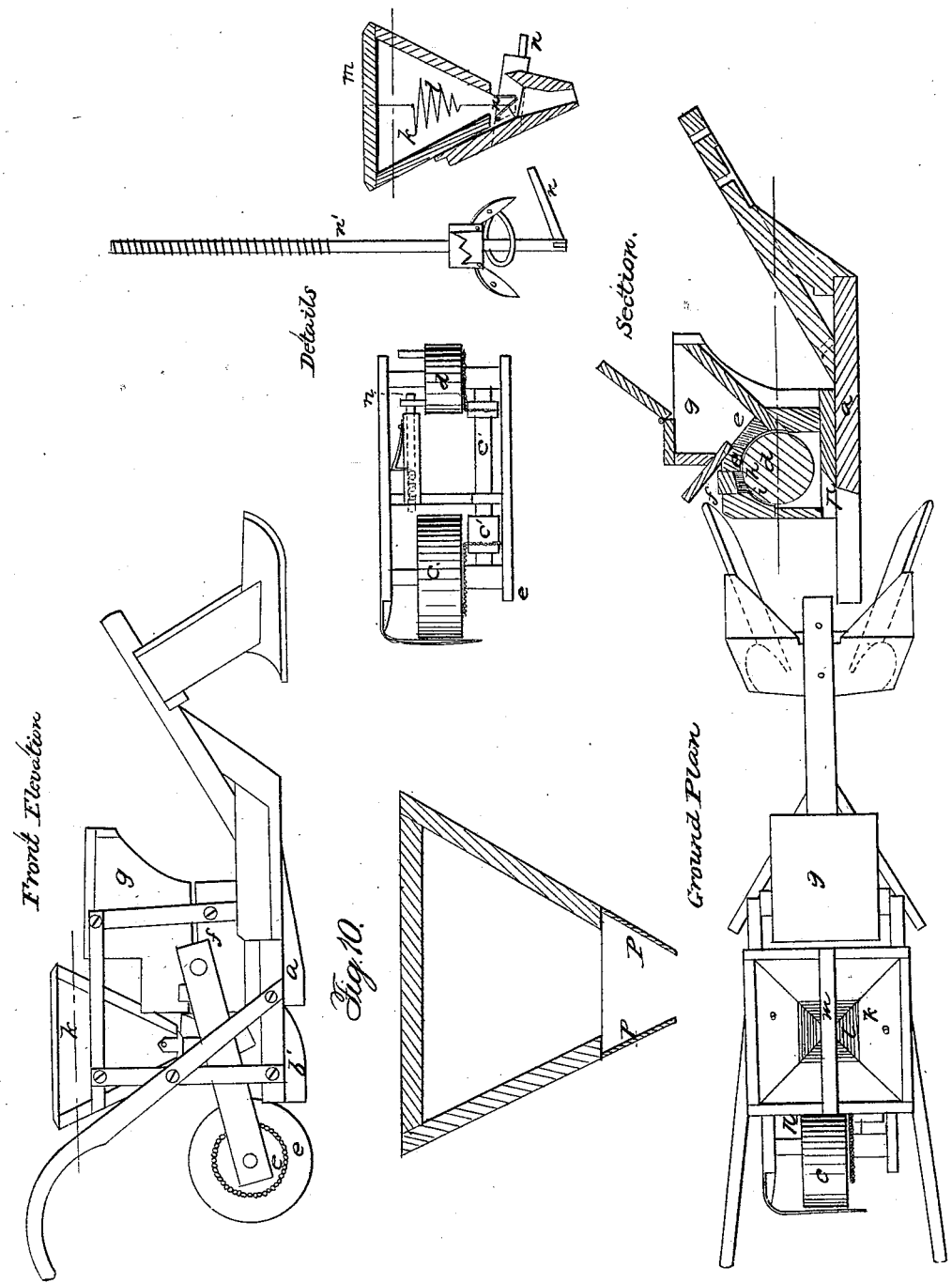

UNITED STATES PATENT OFFICE.

JOSHUA WOODWARD, OF HAVERHILL, NEW HAMPSHIRE.

IMPROVEMENT IN SEED-PLANTERS.

Specification forming part of Letters Patent No. 9,125, dated July 13, 1852.

*To all whom it may concern:*

Be it known that I, JOSHUA WOODWARD, of Haverhill, in the county of Grafton and State of New Hampshire, have invented certain new and useful Improvements in Seed-Planters; and I do hereby declare that the following is a full, clear, and exact description of the principle or character which distinguishes them from all other things before known, and of the usual manner of making, modifying, and using the same, reference being had to the accompanying drawing, making a part thereof.

My improvements consist in the more effectually supplying seed to the seed-roller to cause it to drop regularly. I also describe an apparatus for supplying plaster to the drill, and also the parts of the drill for opening and closing the ground where the seed is planted, which latter is an improvement upon the drill of Todd, which I have found best adapted to the purpose of seeding.

The general form of my apparatus is like that of Todd, above named. The ground is opened in front, as in his machine, the bottom of the plow being flat and having a wedge-formed rib, $a$, in the center, with the point forward. The rear end of this wedge is bifurcated, and here the seed is dropped. Beyond this there is an opening, $b$, that I have found necessary to make to prevent the machine from clogging, as Todd's is constantly doing, and on either side of the opening are coverers $b'$, behind and between which is a heavy roller, $c$, to press the ground down. This roller is connected by a bevel-gear and line-shaft, $c'$, at right angles to its axis, with a seeding-cylinder, $d$, that measures and delivers the seed to be planted. This cylinder can have any number of revolutions given to it, proportional to the roller $c$, by larger or smaller bevel or crown wheels being placed upon the face of the roller meshing into the pinion on shaft $c'$. The upper part of the cylinder $d$ is in a chamber, $e$, (see section,) separate from the seed-hopper $g$ by a sliding gate, $f$, which leaves only a suitable space at the bottom for the corn to enter. Thence the corn is carried up, without clogging, in a loose manner (unincumbered by the weight of the corn in the hopper, which this arrangement is intended to prevent) to the brush, where it is easily controlled; and to further insure the equalizing I place beyond the straight brush $h$ a concave one, $i$, that catches all the surplus that may escape brush $h$. In this way I have attained great perfection in seeding for plaster, &c. I have an additional hopper, $k$, in which I suspend a bent wire spring, $l$, conforming in some degree to the inside of the hopper, or like a spiral spring formed on an inverted pyramid. One end of this wire I attach to a cross-bar, $m$, at the top of the hopper. The other end passes down through the opening in the bottom, and is connected with a lever, $n$, that is worked up and down by a pin on the cylinder $d$. This motion can be varied in any convenient way, and by working the spring thus in the plaster prevents clogging and insures a regular delivery.

To plant such seed as tenaciously cling to each other—such as cotton-seed—I employ the device shown in Figure X, worked in place of the spring above named. This latter device consists of a perpendicular rod, $n'$, running down through the hopper and worked by the lever $n$ up and down. On this lever are any convenient number of jointed radial hooks or arms $o$, which, while the rod $n'$ is being raised, close in toward the shaft, and when the rod descends they open and catch the seed, which they drag down in sufficient quantity. The bottom of the hopper is composed of spring sides $p$, that open as the seed comes down to deliver it, and then close on the return of rod $n'$.

Having thus fully described my improved seeding apparatus and the various modes I contemplate modifying it, as required by law, what I claim therein as new, and for which I desire to secure Letters Patent, is—

The hooked rod $n'$, constructed and arranged substantially in the manner and for the purpose set forth.

JOSHUA WOODWARD.

Witnesses:
WM. GREENOUGH,
J. BECKWITH WEST.